United States Patent
Lyle et al.

(10) Patent No.: US 9,569,754 B2
(45) Date of Patent: Feb. 14, 2017

(54) UNIFIED VIEW OF AGGREGATED CALENDAR DATA

(75) Inventors: Ruthie D. Lyle, Durham, NC (US); Corinne M. Ryan, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 2922 days.

(21) Appl. No.: 11/567,945

(22) Filed: Dec. 7, 2006

(65) Prior Publication Data

US 2008/0141142 A1    Jun. 12, 2008

(51) Int. Cl.
*G06F 3/048* (2013.01)
*G06Q 10/10* (2012.01)

(52) U.S. Cl.
CPC ........ *G06Q 10/109* (2013.01); *G06Q 10/1095* (2013.01)

(58) Field of Classification Search
CPC .............. G06Q 10/1095; G06Q 10/109; G06Q 10/06314
USPC ...................................... 715/763, 764; 707/3
See application file for complete search history.

(56) References Cited

U.S. PATENT DOCUMENTS

| | | | | |
|---|---|---|---|---|
| 5,873,108 | A * | 2/1999 | Goyal et al. | 715/203 |
| 6,016,478 | A * | 1/2000 | Zhang et al. | 705/7.19 |
| 6,266,295 | B1 | 7/2001 | Parker et al. | |
| 6,370,554 | B1 | 4/2002 | Sun-Woo | |
| 6,457,045 | B1 * | 9/2002 | Hanson et al. | 709/206 |
| 2004/0122803 | A1 * | 6/2004 | Dom et al. | 707/3 |
| 2005/0238156 | A1 * | 10/2005 | Turner | 379/202.01 |

FOREIGN PATENT DOCUMENTS

JP    5233186    9/1993

OTHER PUBLICATIONS

Microsoft Corporation, Microsoft Office Outlook 2003, copyright 1995-2003, version 11.8118.8132 with service pack 2. pp. 1-5 in Outlook.pdf.*
Melissa and the Sender of the Cards, "A Surprise Party for Cedric!," May 27, 2005, pp. 1-3. Available World Wide Web at http://web.archive.org/web/20050527081600/http://www.beust.com/birthday/evite.html.*
Advanced Outlook, Sep. 1, 2006, SUNY, pp. 1-12.*
Mira Dontcheva, Summarizing Personal Web Browsing Sessions, Jul. 21, 2006, Dontcheva.org, pp. 1-11.*

* cited by examiner

*Primary Examiner* — Jeffrey A Gaffin
*Assistant Examiner* — Justin Lee
(74) *Attorney, Agent, or Firm* — Steven M. Greenberg, Esq.; CRGO Law

(57) ABSTRACT

Embodiments of the present invention address deficiencies of the art in respect to calendaring and scheduling and provide a novel and non-obvious method, system and computer program product for providing a unified view of aggregated calendar data in a C&S system. In one embodiment of the invention, a method for providing a unified view of aggregated calendar data for an event in a calendar view can be provided. The method can include selecting an event in the calendar view, aggregating calendar data for the event relating to all invitees for the event, computing statistics for the aggregated calendar data, and rendering a display of the computed statistics proximate to the selected event in the calendar view.

20 Claims, 2 Drawing Sheets

UNIFIED VIEW OF AGGREGATED CALENDAR DATA

BACKGROUND OF THE INVENTION

Field of the Invention

The present invention relates to the field of calendaring and scheduling and more particularly to calendar entry management in a calendaring and scheduling (C&S) system.

Description of the Related Art

Calendaring systems have formed the core component of personal information management software and firmware applications for decades. Initially, a mere calendar display, modern calendaring systems provide scheduling and alarm functions in addition to full integration with contact management, time entry, billing and project management applications. The typical calendaring application minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

Several software products include support for Calendaring & Scheduling (C&S). Known C&S products include Lotus™ Notes™, Microsoft™ Outlook™, and web-based products like Yahoo!™ Calendar™. These products allow one to manage personal events including appointments and anniversaries. C&S products also typically allow one to manage shared events, referred to generally as meetings. Electronic C&S software allows a group of people to negotiate around the scheduling of a proposed event such as a meeting, with the goal of selecting a time that allows most of the group to attend.

Specifically, collaborators who participate in e-meetings often maintain a personal schedule managed by a scheduling system. Collaborators can schedule e-meetings within the personal schedule sua sponte, or the collaborators can schedule e-meetings responsive to the receipt of an invitation. An invitation typically contains data regarding the e-meeting such as a topic, list of invitees, and most importantly, a date, time and location for the e-meeting. Using this data, the invitee can be prompted either to accept or decline the invitation. Oftentimes, the acceptance or declination of an invitation can be accomplished with a single user action such as a mouse click.

The typical C&S system provides a thirty (30) day calendar view for all events scheduled during the thirty days reflected in the calendar view. Each day in the thirty day calendar view can display twenty-four hours of time slots for the day. Notably, while the thirty day calendar view can be a very helpful tool for the average C&S system user, limitations subsist in the thirty day calendar view which makes it difficult for some C&S system users to readily identify important calendar data for a scheduled calendar event in the C&S system.

In this regard, in a C&S system, a meeting chairperson can schedule a calendar event involving a multiplicity of C&S users—sometimes dozens, hundreds or even thousands of C&S system users. For the meeting chairperson, it can be important to know how many of the invited C&S system users have agreed to participate in the scheduled calendar event. It further can be important to know from where the invited C&S system users will participate in the scheduled calendar event. For a scheduled calendar event of only a few invitees, it is a trivial exercise to open the scheduled calendar event into a single day view, and then a single time slot view to identify the requisite calendar data. For a scheduled calendar event of many invitees, however, such an exercise can be exhausting and error prone.

BRIEF SUMMARY OF THE INVENTION

Embodiments of the present invention address deficiencies of the art in respect to calendaring and scheduling and provide a novel and non-obvious method, system and computer program product for providing a unified view of aggregated calendar data in a C&S system. In one embodiment of the invention, a method for providing a unified view of aggregated calendar data for an event in a calendar view can be provided. The method can include selecting an event in the calendar view, aggregating calendar data for the event relating to all invitees for the event, computing statistics for the aggregated calendar data, and rendering a display of the computed statistics proximate to the selected event in the calendar view.

In one aspect of the embodiment, aggregating calendar data for the event relating to all invitees for the event can include aggregating a list of invitees for the event and grouping the invitees in the list according to which invitees have accepted an invitation to the event, which invitees have declined an invitation to the event, and which invitees have not yet responded to an invitation to the event. In another aspect of the embodiment, aggregating calendar data for the event relating to all invitees for the event can include aggregating a list of anticipated locations from which accepting ones of the invitees are to participate in the event, and grouping the list according to different locations.

In another aspect of the embodiment, computing statistics for the aggregated calendar data can include computing percentages of those invitees who have accepted an invitation to the event, those invitees who have declined the invitation, and those invitees who have not yet responded to the invitation. In yet another aspect of the embodiment, computing statistics for the aggregated calendar data can include computing percentages for different locations for those invitees who have accepted an invitation to the event and who have indicated a particular location from which to participate in the event.

Finally, rendering a display of the computed statistics proximate to the selected event in the calendar view further can include rendering a display of those invitees who have not yet responded to the invitation. In this regard, presence awareness can be applied to the display of invitees who have not yet responded to the invitation. Additionally, an invitee in the display of invitees can be linked to launch a corresponding message directed to the linked invitee.

In another embodiment of the invention, a C&S data processing system configured for providing a unified view of aggregated calendar data for an event in a calendar view can be provided. The system can include a C&S system disposed in a host computing platform, a data store of calendar events coupled to the C&S system, a calendar view provided by the C&S system, and calendar data aggregation logic. The logic can include program code enabled to select an event in the calendar view, to aggregate calendar data for the event relating to all invitees for the event, to compute statistics for the aggregated calendar data, and to render a display of the computed statistics proximate to the selected event in the calendar view. Notably, the calendar view can include a daily view, a weekly view or a monthly view.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for providing a unified view of aggregated calendar data in a C&S system. In accordance with an embodiment of the present invention, an event in a calendar view can be activated to trigger an aggregation of calendar data for the event and a corresponding rendering of a unified view of the aggregated calendar data for the event. The aggregation of calendar data can include statistical data for the acceptance and declination of the event by the invitees for the event, or the anticipated locations of attendance indicated by the invitees in respective acceptances to an invitation for the event. Optionally, the unified view further can indicate with presence awareness those invitees to the event whom have not yet accepted or declined an invitation for the event.

Figure 1A:
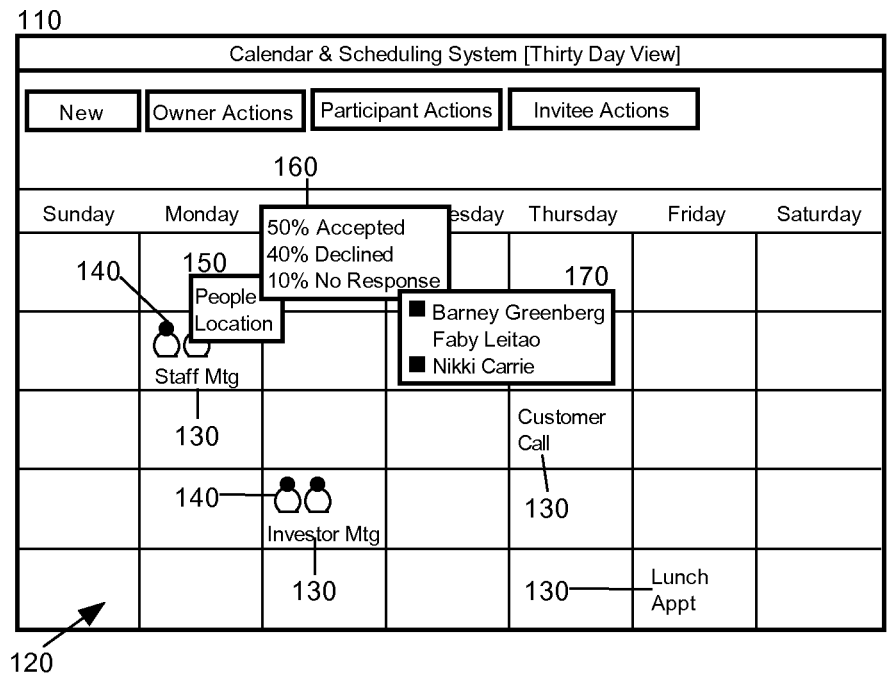
FIGS. 1A and 1B, taken together, are a pictorial illustration of an exemplary C&S system thirty day view configured for providing a unified view of aggregated calendar data.
Figure 1B:
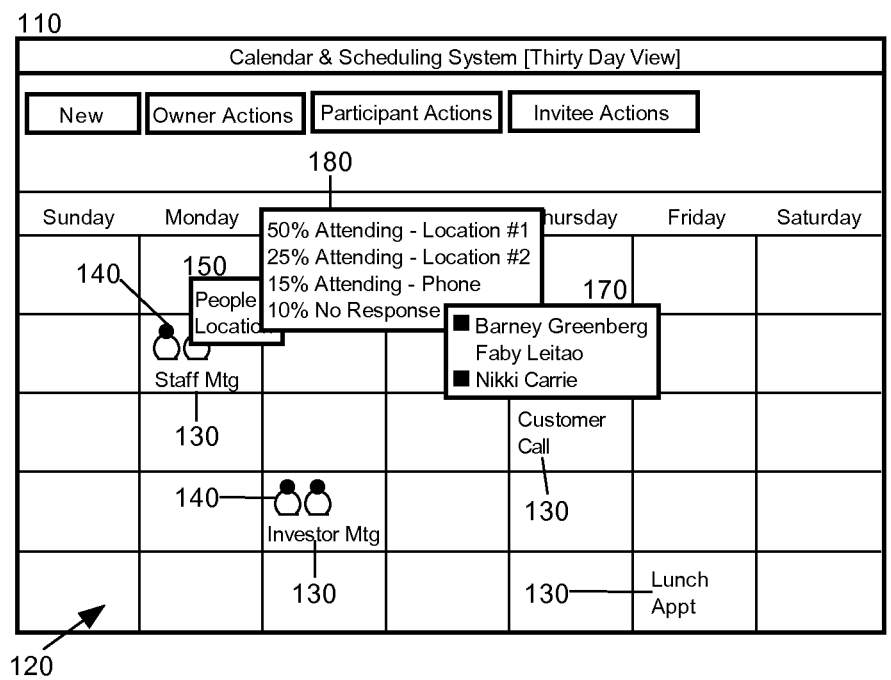

In illustration, FIGS. 1A and 1B, taken together, are a pictorial illustration of an exemplary C&S system thirty day view configured for providing a unified view of aggregated calendar data. The thirty day view 110 shown in FIG. 1A and FIG. 1B can include a monthly calendar view 120 into which different events 130 can be scheduled. Different events 130 can be enabled for providing a unified view of corresponding aggregated calendar data. In this regard, an activatable icon 140 can be provided in proximity to the event 130 which, when activated, can trigger the aggregation of calendar data for the event 130.

The aggregation of calendar data for the event 130 can include statistical data for the acceptance and declination of the event by the invitees for the event. Additionally, the aggregation of calendar data for the event 130 can include the anticipated locations of attendance indicated by the invitees in respective acceptances to an invitation for the event. Once the activatable icon 140 has been activated, a view selection pop-up menu 150 can be provided allowing the selection of a view 160 to the invitees associated with the event 130, or a selection of a view 180 to the anticipated locations of attendance indicated by the invitees in respective acceptances to an invitation for the event 130.

The view 160 to the invitees associated with the event 130 can include a view to statistical data indicating a percentage of invitees for the event 130 that have accepted an invitation to the event 130, a percentage of invitees for the event 130 that have declined the invitation to the event 130, and a percentage of invitees yet to respond to the invitation to the event 130. By comparison, the view 180 to the anticipated locations of attendance indicated by the invitees in respective acceptances to an invitation for the event 130 can include a view to statistical data indicating different percentages of the invitees to the event 130 that have accepted an invitation to the event 130 that further have indicated a preference to participate at a particular location.

As before, the view 180 also can include a percentage of invitees yet to respond to an invitation to the event 130. In both views 160, 180, however, the indication of the percentage of invitees yet to respond can be configured for activation. In response to activation of the indication of the percentage of invitees yet to respond, a list of invitees view 170 can be provided. The list of invitees view 170 can include a listing of those invitees that have yet to respond to an invitation for the event 130. Each name in the listing can be activated to initiate communication with a corresponding one of the invitees, for instance by instant messaging. Additionally, each name in the listing can include presence awareness.

Figure 2:
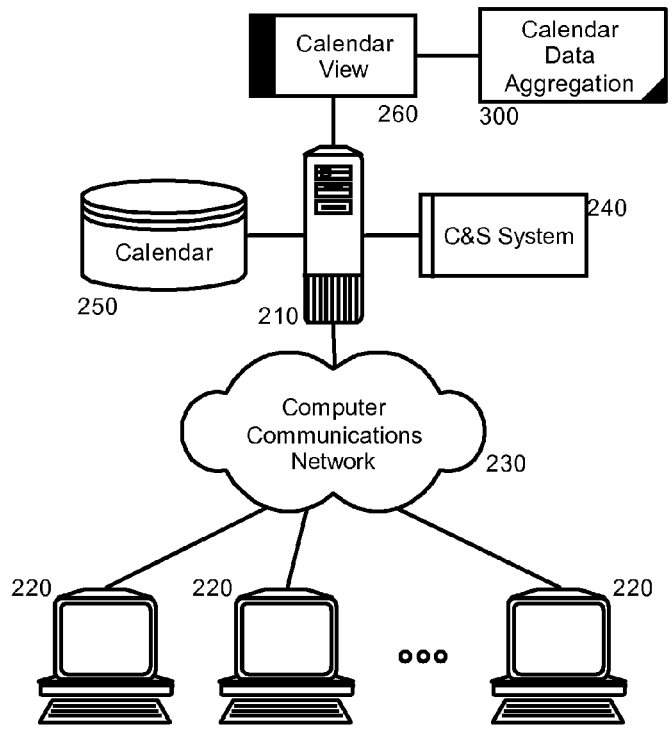
FIG. 2 is a schematic illustration of a C&S system for providing a unified view of aggregated calendar data; and, FIG. 3 is a flow chart illustrating a process for providing a unified view of aggregated calendar data in a C&S system.

In further illustration, FIG. 2 is a schematic illustration of a C&S system configured for providing a unified view of aggregated calendar data. The system can include a host computing platform 210 supporting the operation of a C&S system 240. A data store of calendar events 250 can be coupled to the host computing platform 210 and configured to store calendar events for the C&S system 240. The host computing platform 210 can be communicatively coupled to one or more collaborative computing clients 220 over computer communications network 230 so as to permit the collaborative computing clients 220 to access the C&S system 240 concurrently.

The C&S system 240 can be configured to produce a calendar view 260. The calendar view 260 can include a thirty day calendar view, a weekly calendar view, or a daily calendar view, by way of example. The calendar view 260 can be coupled to calendar aggregation logic 300. The calendar aggregation logic 300 can include program code enabled to aggregate calendar data for a selected event and to present the aggregated calendar data in a unified view in association with the selected event in the calendar view 260. For example, the aggregated calendar data can include statistical data for the acceptance and declination of the selected event by the invitees for the selected event, or the anticipated locations of attendance indicated by the invitees in respective acceptances to an invitation for the selected event.

Figure 3:
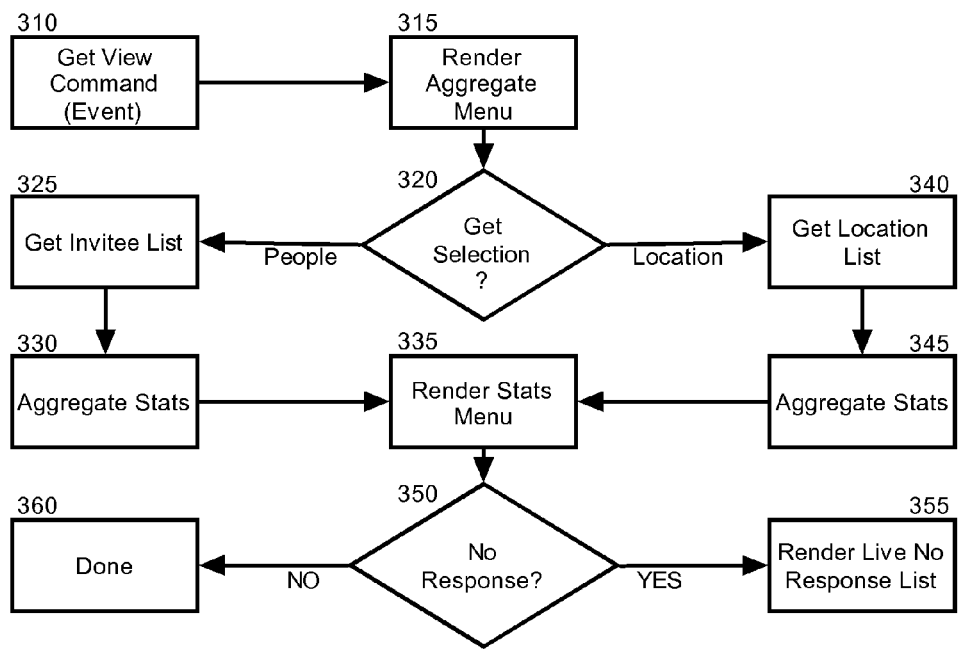

In yet further illustration of the operation of the calendar data aggregation logic 300, FIG. 3 is a flow chart illustrating a process for providing a unified view of aggregated calendar data in a C&S system. Beginning in block 310, a view command can be received in association with a selected event such as by mouse clicking an icon associated with the selected event. In block 315, an aggregate menu can be rendered providing a choice of providing an invitee list view or a location list view. In decision block 320, a selection can be received through the aggregate menu. If the selection is to provide an invitee list view, the process can continue through block 325. Otherwise, the process can continue through block 340.

In block 325, an invitee list can be retrieved for the selected event and it can be determined whether each invitee in the list has accepted or declined an invitation to participate in the selected event. Additionally, invitees in the list that have not yet responded to the invitation for the selected event can be noted. Thereafter, in block 330, statistics for the different groups of invitees in the list can be accumulated, for instance a percentage of the invitees that have accepted the invitation, a percentage of the invitees that have declined the invitation, and a percentage of invitees in the list that have not yet responded to the invitation.

In block 340, a location list can be retrieved for the selected event. In this regard, for each invitee accepting an invitation for the selected event, it can be determined from where the invitee intends upon participating in the selected event. Additionally, invitees in the list that have not yet responded to the invitation for the selected event can be noted. Thereafter, in block 345, statistics for the different groups of locations can be accumulated, for instance a percentage of accepting invitees choosing to participate from each location, and a percentage of invitees that have not yet responded to the invitation.

In either circumstance, in block 335 a view can be rendered to include the accumulated statistics. Thereafter, in block 350 it can be determined if a request has been received to identify those invitees that have not yet responded to the invitation. If not, the process can end in block 360. Otherwise, in block 355, a listing of the non-responsive invitees can be rendered in a separate view of non-responsive invitees. As part of the separate view, presence awareness for each of the non-responsive invitees. Furthermore, the individual names in the list of non-responsive invitees can be enabled for activation such that the selection of any one of individual names can launch a message for the corresponding invitee.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for providing a unified view of aggregated calendar data for an event in a calendar view, the method comprising:

receiving, by a processor of a computer, a view command in association with a selected event upon a user selecting an event in the calendar view;

aggregating, by the processor of the computer, calendar data for the selected event relating to all invitees receiving an invitation to the selected event;

computing, by the processor of the computer, statistical values for all of the aggregated calendar data; and, rendering, by the processor of the computer, a display of the aggregated calendar data proximate to the selected event in the calendar view and also rendering a display of the computed statistical values for all of the aggregated calendar data in a pop-up view proximate to the selected event in the calendar view.

2. The method of claim 1, wherein the user selecting the event in the calendar view comprises selecting an icon positioned adjacently to the event in the calendar view.

3. The method of claim 1, wherein aggregating calendar data for the selected event relating to all invitees receiving the invitation to the selected event comprises aggregating a list of invitees for the selected event and grouping the invitees in the list of invitees according to which invitees have accepted the invitation to the selected event, which invitees have declined the invitation to the selected event, and which invitees have not yet responded to the invitation to the selected event.

4. The method of claim 1, wherein aggregating calendar data for the selected event relating to all invitees receiving the invitation to the selected event comprises aggregating a list of anticipated locations from which accepting ones of the invitees are to participate in the selected event, and grouping the list of anticipated locations according to different locations.

5. The method of claim 1, wherein computing statistics for the aggregated calendar data comprises computing percentages of those invitees who have accepted the invitation to the selected event, those invitees who have declined the invitation, and those invitees who have not yet responded to the invitation.

6. The method of claim 1, wherein computing statistics for the aggregated calendar data comprises computing percentages for different locations for those invitees who have accepted the invitation to the selected event and who have indicated a particular location from which to participate in the selected event.

7. The method of claim 5, wherein rendering the display of the computed statistics proximate to the selected event in the calendar view further comprises rendering the display of those invitees who have not yet responded to the invitation.

8. The method of claim 7, further comprising applying presence awareness to the display of invitees who have not yet responded to the invitation.

9. The method of claim 7, further comprising linking an invitee in the display of invitees to launch a corresponding message directed to the linked invitee.

10. A calendaring and scheduling (C&S) data processing system configured for providing a unified view of aggregated calendar data for an event in a calendar view, the system comprising:
 a C&S system disposed in a host computing platform;
 a data store of calendar events coupled to the C&S system;
 a calendar view provided by the C&S system; and,
 calendar data aggregation logic comprising program code enabled to: receive a view command in association with a selected event upon a user selecting an event in the calendar view, to aggregate calendar data for the selected event relating to all invitees receiving an invitation to the selected event, to compute statistical values for all of the aggregated calendar data, and to render a display of the aggregated calendar data proximate to the selected event in the calendar view and also rendering a display of the computed statistical values for all of the aggregated calendar data in a pop-up view proximate to the selected event in the calendar view.

11. The system of claim 10, wherein the calendar view comprises a view selected from the group consisting of a daily view, a weekly view and a monthly view.

12. A computer program product comprising a non-transitory computer usable storage medium having computer usable program code for providing a unified view of aggregated calendar data for an event in a calendar view, the computer program product including:
 computer usable program code for receiving a view command in association with a selected event upon a user selecting an event in the calendar view;
 computer usable program code for aggregating calendar data for the event relating to all invitees receiving an invitation to the selected event;
 computer usable program code for computing statistical values for all of the aggregated calendar data; and,
 computer usable program code for a display of the aggregated calendar data proximate to the selected event in the calendar view and also rendering a display of the computed statistical values for all of the aggregated calendar data in a pop-up view proximate to the selected event in the calendar view.

13. The computer program product of claim 12, wherein the computer usable program code for the user selecting the event in the calendar view comprises computer usable program code for selecting an icon positioned adjacently to the event in the calendar view.

14. The computer program product of claim 12, wherein the computer usable program code for aggregating calendar data for the selected event relating to all invitees receiving the invitation to the selected event comprises computer usable program code for aggregating a list of invitees for the selected event and grouping the invitees in the list of invitees according to which invitees have accepted the invitation to the selected event, which invitees have declined the invitation to the selected event, and which invitees have not yet responded to the invitation to the selected event.

15. The computer program product of claim 12, wherein the computer usable program code for aggregating calendar data for the selected event relating to all invitees receiving the invitation to the selected event comprises computer usable program code for aggregating a list of anticipated locations from which accepting ones of the invitees are to participate in the selected event, and grouping the list of anticipated locations according to different locations.

16. The computer program product of claim 12, wherein the computer usable program code for computing statistics for the aggregated calendar data comprises computer usable program code for computing percentages of those invitees who have accepted the invitation to the selected event, those invitees who have declined the invitation, and those invitees who have not yet responded to the invitation.

17. The computer program product of claim 12, wherein the computer usable program code for computing statistics for the aggregated calendar data comprises computer usable program code for computing percentages for different locations for those invitees who have accepted the invitation to the selected event and who have indicated a particular location from which to participate in the selected event.

18. The computer program product of claim 16, wherein the computer usable program code for rendering the display of the computed statistics proximate to the selected event in the calendar view further comprises computer usable program code for rendering the display of those invitees who have not yet responded to the invitation.

19. The computer program product of claim 18, further comprising computer usable program code for applying presence awareness to the display of invitees who have not yet responded to the invitation.

20. The computer program product of claim 18, further comprising computer usable program code for linking an invitee in the display of invitees to launch a corresponding message directed to the linked invitee.

* * * * *